United States Patent [19]

Heimann

[11] Patent Number: 5,678,963
[45] Date of Patent: Oct. 21, 1997

[54] METHOD FOR TRUING SETS OF RAIL VEHICLE WHEELS BY CHIP REMOVAL AND UNDER-FLOOR MACHINE FOR PERFORMING THE METHOD

[75] Inventor: Alfred Heimann, Aachen, Germany

[73] Assignee: Hegenscheidt-MFD GmbH, Erkelenz, Germany

[21] Appl. No.: 555,499

[22] Filed: Nov. 8, 1995

[30] Foreign Application Priority Data

Nov. 9, 1994 [EP] European Pat. Off. ............. 94117685

[51] Int. Cl.$^6$ ................................................ B23C 3/04
[52] U.S. Cl. .......................... 409/131; 33/1 Q; 33/555;
33/644; 82/104; 82/105; 409/165; 409/166;
409/188; 409/195; 451/9; 451/11; 451/242;
451/246; 451/254; 451/920
[58] Field of Search ................. 82/104, 105; 451/920,
451/9, 10, 11, 242, 246, 254; 409/131,
165, 166, 188, 195; 33/1 Q, 550, 555, 644

[56] References Cited

U.S. PATENT DOCUMENTS

| | | | |
|---|---|---|---|
| 3,203,286 | 8/1965 | Dombrowski | 82/11.1 |
| 3,839,932 | 10/1974 | Dombrowski | 82/104 |
| 4,116,094 | 9/1978 | Dombrowski et al. | 82/8 |
| 4,134,314 | 1/1979 | Luzina | 81/1 C |
| 4,597,143 | 7/1986 | Dombrowski | 29/27 R |
| 4,674,369 | 6/1987 | Gutohrlein et al. | 82/104 |
| 4,674,370 | 6/1987 | Gutohrlein et al. | 82/104 |
| 4,783,992 | 11/1988 | Ishibashi | 73/146 |
| 4,798,964 | 1/1989 | Schmalfuss et al. | 250/560 |
| 4,802,285 | 2/1989 | Ligacz et al. | |
| 5,105,691 | 4/1992 | Brinkmann et al. | 82/105 |
| 5,390,151 | 2/1995 | Ozawa | 356/426 |

FOREIGN PATENT DOCUMENTS

| | | | |
|---|---|---|---|
| 0252164 | 1/1988 | European Pat. Off. | |
| 1269726 | 7/1961 | France | |
| 1200097 | 9/1965 | Germany | |
| 3823832 C1 | 3/1989 | Germany | 82/105 |
| 1005764 | 9/1965 | United Kingdom | |
| 2091619 | 8/1982 | United Kingdom | |

Primary Examiner—Daniel W. Howell
Assistant Examiner—Christopher Kirkman
Attorney, Agent, or Firm—W. G. Fasse; W. F. Fasse

[57] ABSTRACT

Wheels of rail vehicles are trued while the wheels are kept rotating about a wheel center of rotation that is continuously corrected to keep the center of rotation in a fixed position in response to eccentricities a wheel may have, especially in its outer circumference. For this purpose, a sensor for each wheel of two wheels forming a set senses a respective excursion of a center of rotation of each wheel being trued in a set to provide respective excursion signals which are supplied to a central processing unit that provides control signals to a power drive for wheel guide rollers which support the wheel set to be trued. The power drive applies wheel position adjusting force components, preferably directed radially relative to the respective wheel rotational axis in response to the control signals from the central processing unit whereby the excursions are compensated and the wheel rotation center is kept in a fixed position. The truing machine is an under-floor machine equipped with sensors for sensing the excursions and with a central computerized control for producing correction signals from excursion signals to control the wheel guide roller power drive.

19 Claims, 2 Drawing Sheets

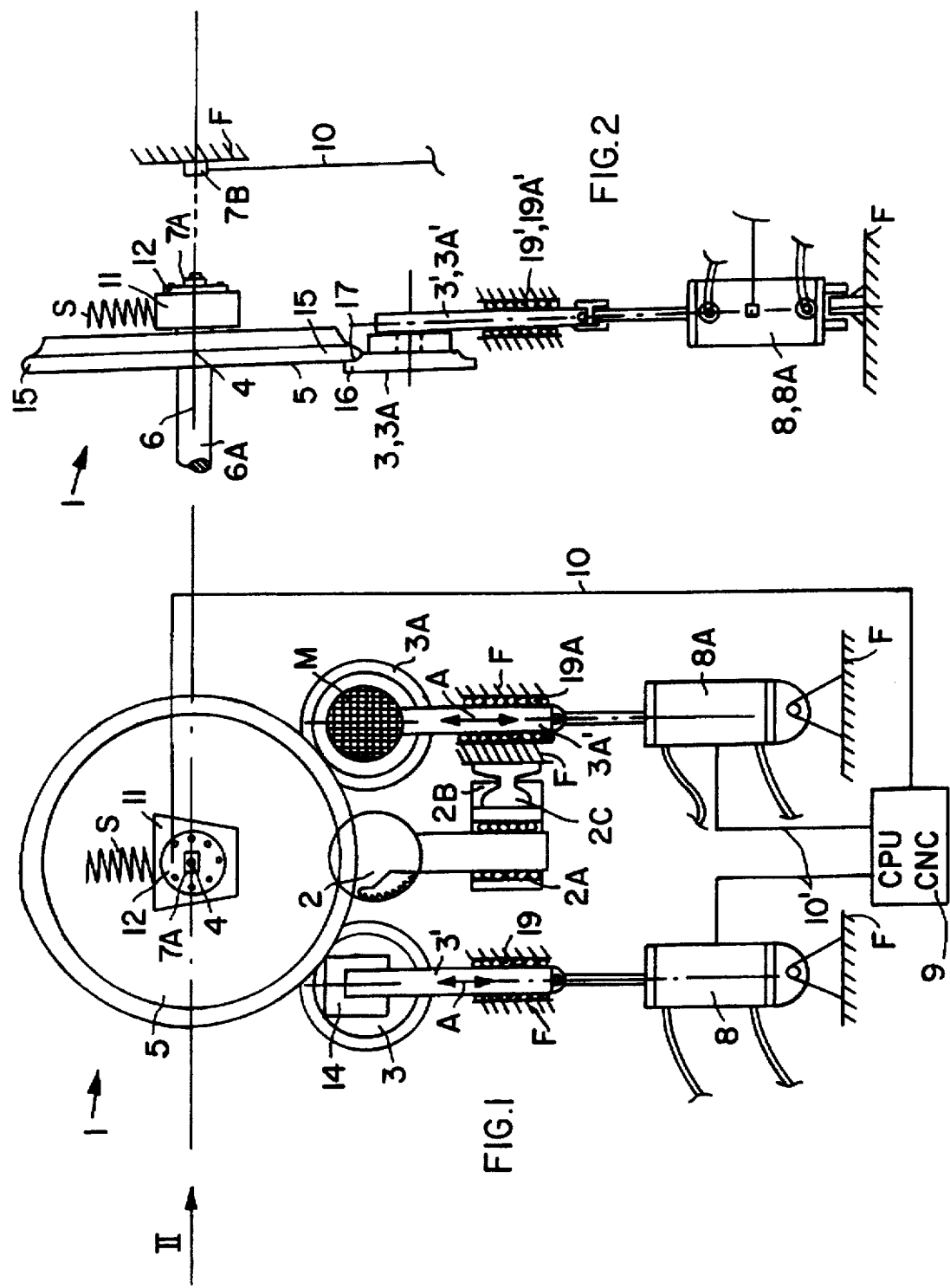

1

METHOD FOR TRUING SETS OF RAIL VEHICLE WHEELS BY CHIP REMOVAL AND UNDER-FLOOR MACHINE FOR PERFORMING THE METHOD

FIELD OF THE INVENTION

The invention relates to truing sets of rail vehicle wheels such as railroad wheels. Such truing operations are performed by at least one tool or cutter head that has a profile corresponding to the wheel profile. The wheel set is supported and/or driven by rollers that form part of an under-floor apparatus for performing the present method.

BACKGROUND INFORMATION

Methods for truing railroad wheel sets are known and are employed for truing new wheel sets as well as for restoring used railroad wheel sets to a rated profile. The truing involves a chip removal either by a turning operation or by a milling operation on so-called under-floor machines. An advantage of under-floor machines is seen in that the truing operation can be performed while the wheel sets remain installed in railroad cars, whereby a time consuming and involved removal of the wheel sets from the railroad cars and the subsequent installation are avoided. However, conventional methods still face the problem of achieving the required high quality truing. Even small eccentricities remaining after truing are not acceptable. Further, there is room for improvement with regard to assuring a sufficient stability of the machining operation.

Currently, substantially three principles are employed in the under-floor wheel set machining operations. In a first conventional wheel truing operation, the wheel set is mounted between two centering pins or tail stocks during an under-floor truing operation. The centering pins engage respective axial centering bores in the ends of the wheel set axle in order to center the wheel set. The centering pin mechanism has a relatively simple construction that is independent of the particular vehicle type. However, the use of centering pins or tail stocks requires the removal of the wheel bearing housing covers so that the centering pins may be inserted into the respective centering bores in the wheel axle. Removal of these covers is undesirable because the roller bearings of the wheel sets are exposed to a substantial risk of contamination by milling chips and the like. Another disadvantage of using centering pins is seen in that substantial set-up work is necessary and the costs for such a centering device are substantial. Further, centering pins cannot be used economically for wheel sets where gear boxes or special covers make access of the centering pins to the centering bores very difficult.

The second conventional wheel truing operation permits keeping the wheel bearing housings closed by providing a mechanical connection between the wheel bearing housings and the machine bed. More specifically, external bearing supports and hold-down members are used for holding the wheel set in a fixed position relative to the truing tool. These supports and hold-down members referred to as clamping elements must, however, be constructed to conform to the bearing housing configuration. Thus, these clamping elements are suitable only for a particular vehicle type and must be exchanged when wheels of different vehicle types are to be trued. Such exchange again requires manual set up work that should be avoided. Further, the requirement that, for example in under-floor milling operations the wheel sets must be maintained in a fixed horizontal position during the milling operations is hard to satisfy by such clamping elements which are conventionally adjustable in the vertical direction and merely provide a friction fit which is satisfactory for maintaining a fixed position in the vertical direction but becomes technically more problematic for maintaining the wheel sets in an unchanged horizontal position during machining operations.

The third conventional wheel truing operation utilizes the principle of wheel flange centering which does not use any mechanical connection between the truing tool and the wheel set axle so that time consuming set ups or mounting operations are avoided. However, the method employing wheel flange centering also has a substantial disadvantage in that the precision of the wheel profile of the wheel tread surface of a wheel set cannot be better than the concentricity or true running of the wheel flange relative to the rotational axis of the wheel set. Where the wheel flange has a substantial eccentricity which is quite normal for used sets that require truing, the required concentricity of the tread surface can no longer be assured.

German Patent Publication (DE-AS) 1,200,097 (Dombrowski) published on Sep. 2, 1965 discloses an under-floor wheel set profile turning machine which employs the above described principle of wheel flange centering. During the truing operation the wheel set is mounted on fixed but rotatable rollers and the machining is performed with a turning tool that is position controllable relative to the profile to be trued. For this purpose the turning tool is connected with a sensor that senses any possible eccentric motion of the wheel set axle. Thus, independently of the position of the wheel set on the support rollers it shall be assured that the spacing of the turning tool from the wheel set axle remains constant during a revolution of the wheel set. In other words, the turning tool performs a follow-up motion in accordance with any changing position of the wheel set axle. This requirement has, however, the disadvantage that the moving wheel set axle causes the entire vehicle to vibrate since the vehicle is coupled to the wheel set through springs. Since railroad vehicles have a substantial mass, the vibrations apply substantial forces to the wheel set which has a negative effect on the quality of the truing operation and thus on the true quality of the wheel set.

European Patent Publication EP 0,252,164 A1 (Ligacz et al.) published on Jan. 13, 1988 discloses a method for ascertaining the radial position of a new wheel profile to be produced by a reprofiling or truing operation. European Patent Publication EP 0,252,164 corresponds to U.S. Pat. No. 4,802,285 (Ligacz et al.) which refers to a method and apparatus for measuring worn railroad wheel profiles for ascertaining the location of a new profile relative to the worn profile. The new profile is to be produced by a reprofiling or truing operation. For this purpose characteristic points on the worn profile are contacted in a radial and axial direction by a sensor and the respective displacement of the sensor is measured relative to a zero or reference point. The location of these points is then compared in a computer with given references points on a corrected wheel profile. A computerized numerical control then positions the tool in accordance with a control signal resulting from the comparing, whereby the least possible material removal is assured while still obtaining a trued restored wheel profile.

French Patent Publication 1,269,726 (Gautret) published in 1961 discloses a truing apparatus in which the wheel set is supported in a harness comprising springs that bear downwardly on the axle stubs of the wheel set and by piston cylinder operated swingable rollers that bear against the wheel tread from below.

British Patent Publication 1,005,764 (Schondorff) published Sep. 29, 1965 discloses an under-floor profile turning machine for truing wheel sets of rail vehicles. The wheel sets are mounted on driven supporting rollers. The rotating wheel set axle or its nonrotating bearing box is connected to a tracer lever which transmits the movement of the wheel set axle through a feeler to a lifting device that supports the rollers. In this way it is possible to maintain the distance between the rotational central axis of the wheel set axle and the tool edge substantially the same during the truing operation.

U. K. Patent Application 2,091,619 A (Dombrowski) published on Aug. 4, 1982 discloses a method and apparatus for reprofiling railroad vehicle wheels in a set by circumferential milling. The wheel set is supported on rollers as well as at its axle boxes. Prior to the milling operation a reference surface is formed on each wheel by a turning operation to form the basis for a measurement for setting the radial position of the profile milling tool. The milling tool is equipped with a cutter arranged on the profile milling tool which is held in a fixed position during the turning operation for making the reference surface.

The foregoing prior art leaves room for improvement especially with regard to reducing set up times and assuring nevertheless a highly precise truing quality.

OBJECTS OF THE INVENTION

In view of the above it is the aim of the invention to achieve the following objects singly or in combination:

- to provide a method for truing or retruing wheel sets of rail vehicles with a highly precise truing quality without the need for long set up times and expensive mechanical couplings between the tool and the wheel set rotation axis;
- to avoid centering and/or clamping mechanisms for holding the wheel sets in place for the truing operation;
- to provide an apparatus for performing the present method in such a way that set-up times are minimized and a simultaneous truing of both wheels of a set can be performed;
- to keep the rotation center of a rail wheel being trued in a fixed position by a computer provided control signal that is responsive to excursion attempts of the rotation center away from the fixed position relative to a machine frame or bed;
- to true one or preferably both wheels of a set of two wheels simultaneously while still assuring a highly accurate truing with the help of a closed loop feedback control;
- to avoid vehicle vibrations during a truing operation, thereby improving the truing accuracy; and
- to provide a precise axial guiding of the wheel set being trued, preferably by wheel support rollers which also adjust the wheel position.

SUMMARY OF THE INVENTION

Rail wheels of a wheel set (1) are trued according to the invention by a chip removing truing method, wherein at least one tool (2) is operated to form a required profile, whereby the wheel set (1) is supported and/or driven by guide rollers (3), wherein during a truing operation radial position change that could be caused by possibly present wheel eccentricities or wheel unbalances of a rotation center (4) of at least each wheel being trued, are sensed by at least one eccentricity representing sensor device (7), wherein sensed signals from said sensor device (7) are supplied to at least one control unit (9) to provide control signals for controlling the radial position of at least two guide rollers (3) provided for each wheel being trued, each of said two guide rollers being movable with at least one component radially directed relative to a rotation axis (6) of the wheel set (1), said guide rollers (3) being adjustable by at least one adjustment device (8), wherein the adjustment devices (8) adjust the radial position of the at least two guide rollers (3) for each of a corresponding wheel (5) in accordance with the sensed position changes of the respective coordinated wheel (5), so that the rotation center of each wheel being trued is held in a fixed position in space.

The apparatus according to the invention for performing the present method is characterized in that at least one sensor device (7) is provided for at least each wheel (5) being trued for ascertaining wheel eccentricities that would cause radial position changes of a rotation center (4) of a wheel being trued (5), whereby a control signal representing the wheel eccentricities is produced, at least one control conductor (10) connects each sensor device (7) to at least one control unit (9); at least two guide rollers (3) are supporting at least each wheel (5) being trued; the guide rollers are movable at least with one movement or force component directed radially to the rotational axis (6) of a wheel set (1); adjustment devices (8) connected to the guide rollers (3) displace the guide rollers (3) whereby the rotation center (4) at least of each wheel (5) being trued of the rotating wheel set (1) is maintained in a position fixed in space under a control responsive to or corresponding to the sensed eccentricities for controlling the adjustment of the corresponding guide rollers (3).

The method and apparatus according to the invention achieve a very high truing quality or accuracy with a chip removing wheel set truing operation. This high accuracy of the truing is due to the fact that the position of the rotation center of each wheel being trued remains constant even though the wheel being trued rotates on a possibly eccentric circumferential surface that forms the tread surface of the wheel and requires truing. This possibly eccentric surface rotates on the guide rollers that are adjustable with at least one component that is directed radially relative to the rotational axis of the wheel set. By maintaining the wheel set axle in a constant position during the truing of each wheel, no force components are effective between the vehicle or springs connected to the vehicle on the one hand and the wheel set axle on the other hand. Thus, the invention has eliminated negative effects in the form of elastic deformations that could occur heretofore due to vibrational loads. Such elimination in turn has improved the truing quality.

Another advantage of the invention is seen in that the entire rotational axis of the wheel set being trued is maintained in a positioned fixed in space if the measurement of positional changes are sensed simultaneously on both wheels of a set by respective sensor units provided that both wheels of a set are supported by movably mounted guide rollers which are position adjustable in accordance with the sensed positional changes by a control unit which in turn controls adjustment devices for the mounting elements of the guide rollers. Due to the fact that the rotational axis is fixed in space over its entire length, no angular changes occur due to a one sided support on rigidly mounted rollers. As a result, the entire vehicle retains a position fixed in space so that no force components are effective due to any vehicle vibrations. Any errors are also eliminated in the reprofiling of a wheel set if both wheels of the set are sensed and trued simultaneously. Such errors could occur if one wheel of a set is rigidly supported because in that case the angular position of the wheel set axis relative to the horizontal could change.

The invention prevents such change. As a result, the simultaneous truing of both wheels of a set can be performed very advantageously while substantially reducing the required truing time.

The invention uses the components of the present apparatus in an advantageous new combination, whereby the cooperation of surprisingly simple components achieves a very high truing accuracy of wheel sets trued according to the invention with the added advantage that mechanical clamping and/or centering components have been avoided, thereby simplifying the present apparatus substantially.

BRIEF DESCRIPTION OF THE DRAWINGS

In order that the invention may be clearly understood, it will now be described, by way of example, with reference to the accompanying drawings, wherein:

FIG. 1 is a schematic illustration of a truing machine according to the invention with the view direction extending in the direction of the rotation axis of the wheel set being trued and showing two piston cylinder devices for adjusting the guide rollers that support each wheel of a set;

FIG. 2 is a view in the direction of the arrow II in FIG. 1 showing only one wheel of a set and its supporting guide rollers;

Figure 3:
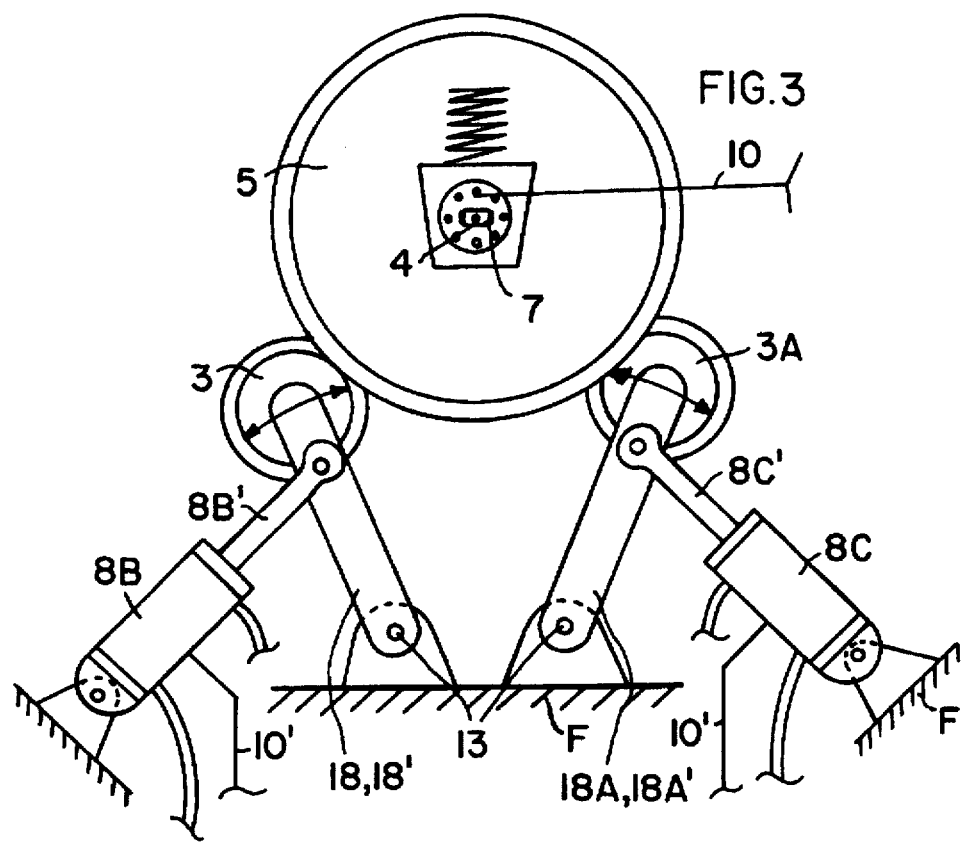
FIG. 3 is a view similar to that of FIG. 1, however showing modified guide roller adjustment devices providing a tilting motion rather than a linear motion, but under the same computerized control as in FIG. 1.

DETAILED DESCRIPTION OF PREFERRED EXAMPLE EMBODIMENTS AND OF THE BEST MODE OF THE INVENTION

Referring to FIGS. 1 and 2 in conjunction, the wheel set 1 has two wheels 5, but only one wheel is shown because the other wheel is mirror-symmetrical to the wheel shown. Similarly, support rollers 3, 3A and adjustment devices 8, 8A for the support rollers are arranged mirror-symmetrically at each end of a wheel set in the plane of the respective wheel 5 so that the illustration and description of one side of the truing apparatus is equally applicable to the other mirror-symmetrical side of the truing apparatus. Each wheel 5 is supported by at least two guide rollers 3 and 3A. At least one of the two guide rollers 3 or 3A is positively driven or rather rotated about a rotation axis 6 of the wheel set 1, for example, by a motor M for rotating the respective wheel 5. The wheel set 1 may be rotated by any other suitable drive, e.g. the motor M connected through a transmission may rotate the shaft 6A. A tool 2, for example a milling tool, is mounted for displacement in a radial direction relative to the rotation axis 6 of the wheel set 1. The tool 2 is mounted, for example, in a ball box 2A for a radial displacement relative to the rotation axis 6. The ball box 2A is mounted to a guide rail 2B which in turn cooperates with a guide rail 2C secured to the machine frame F. This mounting of the tool 2 permits in addition to the radial displacement, a displacement in a direction extending perpendicularly to the plane of the drawing sheet. The direction perpendicularly to the plane of the drawing sheet extends in parallel to the rotation axis 6 of the wheel set 1. A drive mechanism for the feed advance and positioning of the tool 2 is not shown because it is conventional.

Figure 4:
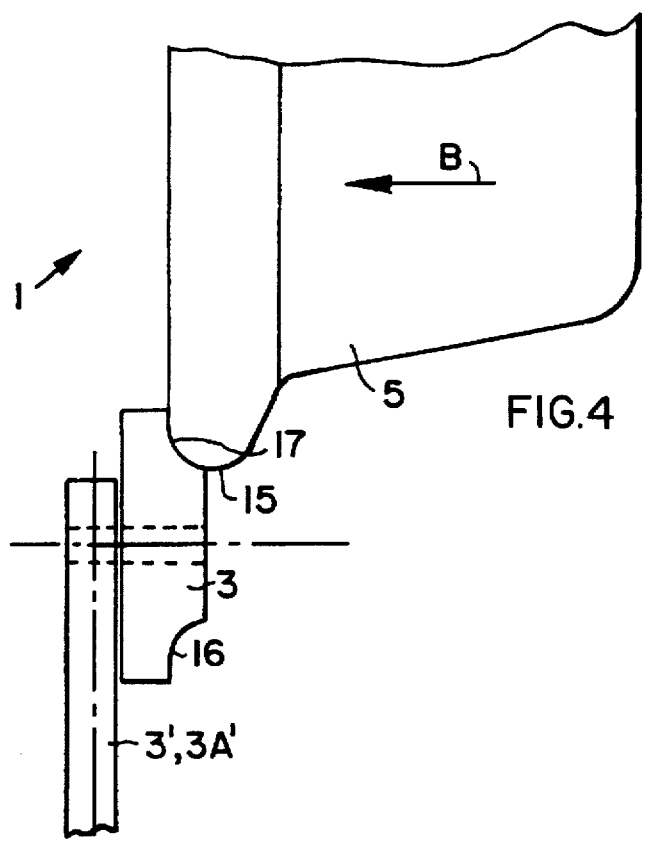
FIG. 4 shows a schematic detail of the conformity between a guide roller circumferential contact surface and a wheel flange of a wheel being trued.

The wheel set 1 rotates about the rotation axis 6 which is concentric to the axle 6A of the wheel set 1. A bearing cover 12 closes a wheel bearing housing 11. Guide rods 3' and 3A' of the guide rollers 3 and 3A which contact the wheel at its circumferential flange surface as best seen in FIG. 4, are movably supported by ball boxes 19 and 19A, respectively. These ball boxes 19, 19A are secured to the machine frame F and permit an axial movement of the guide rods 3' and 3A' up and down as indicated by the arrows A. Such a movement direction of the guide wheel 3, 3A provides a movement component or force component which is preferably directed radially relative to the rotation axis 6 of the wheel set 1. Wheel position adjustment devices in the form of the piston cylinder devices 8 and 8A are connected to the guide rollers 3 and 3A through the guide rods 3', 3A' passing through the ball boxes 19, 19A for position adjusting the rollers 3 and 3A in response to control signals processed in a central processing unit 9 providing a computerized numerical control CNC. Control output conductors 10' of the CPU 9 are symbolically connected to the respective piston cylinder devices 8, 8A. However, the control signals on these conductors 10' will in practice control respective valves for controlling a pressurized fluid for raising and lowering the piston in the respective cylinder. According to the invention, the piston cylinders 8 and 8A are controllable independently of each other or in unison, depending on the computerized numerical control which in turn responds to control signals received on an electrical control conductor 10 from a sensor comprising two sections 7A and 7B.

One sensor section 7A such as a target is secured, for example, to the center of the bearing cover 12 as shown in FIG. 1. The other sensor section 7B is secured to the machine frame F as shown in FIG. 2. The sensor section 7A that is rigidly connected to mark the rotational axis 6 forms a transmitter or reflector. The sensor section 7B forms a receiver for producing a control signal on the control conductor 10. The transmitter 7A is for example a laser diode while the receiver 7B is, for example, a four-quadrant sensor diode. Depending on the receipt of the laser light in any one of the four quadrants, the output signal on the conductor 10 will provide a respective excursion signal away from the rotational axis 6, thereby signifying any tendency of the rotation center 4 of the wheel 5, 5A to move away from the central position.

The excursion signal provided by the cooperation of the sensors 7A, 7B represents an eccentricity of the wheel 5 and/or 5A and is supplied through the control conductor 10 to the central processing unit 9 which thus receives information regarding the size, direction, and velocity of the positional changes of the rotation center 4. Based on this information, the CPU 9 calculates a respective control signal or signals which are supplied on conductors 10' to the position adjusting support power drives 8, 8A for a correction movement of the wheel or wheels in a direction that will keep the rotation center 4 in a fixed position relative to the machine frame F. Thus, the rotation center 4 will, for all practical purpose, maintain the same position relative to the wheel bearing housing 11 and wheel bearing cover 12. By taking the direction, size, and velocity of the sensed positional changes into account the required adjustment motions of the guide rollers 3, 3A are precisely calculated and controlled. The respective control signal controls through the control conductors 10' the motion of the adjustment power drives such as piston cylinders 8, whereby the rotation center 4 of the wheel 5, 5A is continuously held in a position fixed in space relative to the machine frame F so that the spacing of the tool 2 from the rotation center 4 remains constant even if the wheel 5, 5A has an eccentricity, e.g. an eccentric circumferential surface. This feature of the invention makes sure that a very good truing accuracy is achieved for the trued or retrued wheels 5, 5A.

Due to the fact that the rotation center 4 of each wheel being milled is maintained in a fixed position relative to the machine bed or frame F, any causes for generating a vibration of the vehicle through the springs S are avoided. The springs S are arranged between the respective wheel bearing housing 11 and the chassis of the vehicle as is conventional. As a result, the present truing operation can be performed under conditions that are virtually vibration free, thereby assuring a very precise truing accuracy.

FIG. 2 further shows how a contact flange 16 of the guide rollers 3, 3A provides an axial stop or guide by contacting the inner side 17 of the flange 15 of the wheel 5, 5A. This feature is shown on an enlarged scale in FIG. 4, whereby the guide flange 16 restrains the wheel 5 against axial excursions in the direction of the arrow B pointing toward the other wheel of the set. The arrangement is mirror-symmetrical at the other wheel of the set so that a restraint in the direction opposite to the arrow B is also achieved to avoid axial excursions of the wheel set in any horizontal direction within the plane of the drawing sheet.

As described above, and as is clear from FIGS. 1 and 2 taken in combination, the other wheel not shown can be sensed by respective sensors 7A, 7B arranged as shown in FIG. 2 and provided with further control conductors 10 also leading to the central processing unit 9 for a simultaneous positioning of both wheels of a set so that the entire rotational axis 6 is maintained in a position fixed in space relative to the machine frame even if one or both wheels have an eccentricity. In this instance any possibilities of the rotational axis 6 assuming an angular position relative to the horizontal as defined by the machine frame are avoided. Such angular deviations are possible if only one wheel rotation center is held in a fixed position. By excluding such angular deviations of the axis 6 from the horizontal the invention achieves the highest truing accuracy if both wheels of a set 1 are trued or milled simultaneously.

The embodiment of FIG. 3 functions substantially in the same manner as described above, except that in the FIG. 3 embodiment the guide rollers 3, 3A are rotatably mounted to the free ends of mounting elements 18, 18' and 18A, 18A' which are pivoted at 13 to the machine frame F. Position adjusting devices in the form of piston cylinder devices 8B and 8C are controlled as described above and connected with the respective piston rod 8B' and 8C' to the mounting elements 18, 18', and 18A, 18A' respectively. An extension of the piston rod 8B' rotates the roller 3 clockwise while pulling in the piston rod 8B' rotates the roller 3 counter-clockwise around the center 13. Similarly, the mounting element of the guide roller 3A is rotated clockwise when the piston rod 8C' is drawn in while the roller 3A is rotated counterclockwise when the piston rod 8C' is extended. These motion directions are indicated by the arrows C and D respectively in FIG. 3. Both wheels of a set are supported in the manner just described and the respective motions of the guide roller 3, 3A keep the rotation center 4 in a fixed position in response to signals from the sensor 7 processed as described above in the CPU 9. The accuracy of the truing operation performed in accordance with FIG. 3 is the same as described above with reference to FIGS. 1 and 2.

Dividing the sensor 7 shown in FIG. 3 into a first section that is secured to the bearing housing 11 and/or to the bearing cover 12 and into a receiver section that is secured to a fixed point of the machine frame in a position to receive signals from the transmitter portion, has the advantage that the transmitter section has a fixed position relative to the rotation center 4 of the respective wheel. Thus, the attachment of the transmitter portion directly to the rotating wheel axle 6A is not necessary and removing the bearing housing cover is avoided. In order to eliminate inaccuracies in the measurement and to avoid the effects of any angular changes in the rotation axis 6 relative to the horizontal, it is recommended that the transmitter portion 7A of the sensor is positioned as close as possible to the rotation center 4 of the respective wheel.

Another advantage of the invention is seen in that any one of various conventional sensors can be used, such as inductive sensors, capacitive sensors, potentiometer sensors, eddy current sensors, a camera using a CCD Charge Coupled Device, a laser diode forming the transmitter and a four-quadrant diode forming the receiver. The transmitter may be merely a reflector or a target marking on the wheel bearing housing and/or bearing cover that is monitored by a camera with a charge coupled device CCD, for example. Even a triangulation sensor may be used for ascertaining distance changes of points on the bearing housing and/or bearing cover from a fixed reference point. All these possible sensor embodiments have the required measuring precision and measuring speed. Further, the sensors are easily integrated into closed loop feed-back control circuits.

The linear displacement of the guide rollers 3, 3A as shown in FIGS. 1 and 2 and the angular displacement of these guide rollers as shown in FIG. 3 assure the required precise and rapid correction movement for keeping the rotation center 4 of the respective wheel in a fixed position relative to the machine frame F.

A device 14 for measuring the circumference of the wheel being trued is preferably arranged on the guide roller that is not positively rotated by the motor M because there is hardly any slip between the surface of the guide roller that is not positively rotated and the respective wheel surface. Thus, a reliable measurement of the circumference of the wheel and thus also of its diameter is achieved with simple components. Since the dimensions of the idling not positively rotated guide roller are known, the circumference of the wheel being trued can easily be calculated by simply counting the number of guide roller revolutions corresponding to one full turn of the wheel being trued. From the calculated circumference the diameter of the wheel is easily ascertained.

The arrangement shown in FIG. 4 in which the guide flange 16 of the guide roller engages the wheel flange 15 of the wheel being trued, assures a simple, yet effective restraining of the wheel set in the axial direction if such an engagement between the guide roller flange and the respective wheel flange is provided for each wheel of a set. It is preferred that the guide flange 16 contacts the inner or back face 17 of the wheel flange that is not milled for the truing operation. Preferably, the two flanges have a complimentary configuration relative to each other so that a very certain axial guiding free of play of the back facing surface 17 of the wheel flange is assured. The back facing surface 17 of the wheel flange is normally only subject to a small wear so that it retains its original configuration, thereby providing a precise reference surface for the axial guiding and for the truing operation.

Although the above described embodiments use fluid piston cylinder devices 8, 8A, 8B, and 8C for the positioning of the guide rollers, servomotors could be used instead for such positioning in response to a CN control (Computer Numerical Control). Such position adjusting power drives of servomotors or fluid piston cylinders are robust and assure the position adjustment of the guide roller 3, 3A with the required precision and speed.

Although the invention has been described with reference to specific example embodiments, it will be appreciated that it is intended to cover all modifications and equivalents within the scope of the appended claims.

What is claimed is:

1. A method for truing at least one of two rail vehicle wheels (5) forming a wheel set (1) having a central rotation axis (6), by chip removal with a tool (2) contoured to form a rated wheel profile on said wheel or wheels in an under-floor truing machine wherein wheel guide rollers (3, 3A) are position adjustable by respective support power drives (8) capable of imparting to the respective wheel a position adjusting force component, each wheel having a center (4) of rotation normally located in a fixed position on said central rotation axis (6) in a trued wheel, comprising the following steps:

(a) supporting each wheel of a set of two wheels (5, 5A) by at least two of said wheel guide rollers (3, 3A);

(b) driving said wheel set for rotating said wheel set about said central rotation axis of said wheel set;

(c) sensing with a respective sensor for each wheel being trued an eccentricity that would cause an excursion of said center of rotation (4) from said fixed position to produce corresponding eccentricity signals representing the presence of an eccentricity in the respective wheel being trued relative to said fixed position;

(d) feeding said eccentricity signals to a central processing unit to produce control signals; and (e) supplying said control signals to said support power drives (8) for independent controlling through said power drives of (8) the radial position relative to said central rotation axis of at least two wheel guide rollers (3, 3A) provided for each wheel being trued for which an eccentricity has been sensed, by imparting to said two wheel guide rollers a motion component directed radially relative to said central rotation axis (6) such that said excursion of said center (4) of rotation does not occur, whereby said center (4) of rotation is maintained in said fixed position even if the respective wheel has an eccentricity and whereby vibrations of said wheel set are prevented.

2. The method of claim 1, wherein the radial position relative to said central rotation axis of both wheel guide rollers (3, 3A) is adjusted simultaneously in response to sensing an eccentricity signal for each wheel of said wheel set to keep said center of rotation fixed.

3. The method of claim 1, wherein said feeding of said eccentricity signals and said supplying of said control signals is performed as a closed loop feed-back control.

4. An under-floor apparatus for truing sets (1) of rail vehicle wheels (5, 5A), each wheel having a center of rotation (4) normally located in a fixed position on a central rotation axis (6) of said wheel set, comprising at least two guide rollers (3, 3A) for supporting each wheel of said set, a support power drive (8) connected to at least two guide rollers of each wheel for applying a respective position adjusting force component directed radially relative to said central rotation axis (6), a sensor (7) positioned for sensing an eccentricity that would cause an excursion of said center of rotation (4) of each wheel being trued from said central rotation axis (6) to provide eccentricity signals, a central processing unit (9), first electrical conductors (10) electrically connecting said central processing unit to receive said eccentricity signals to produce respective control signals, second electrical conductors connecting said central processing unit (9) to said support power drive (8) for independent adjusting of the radial position relative to said central rotation axis of said at least two guide rollers of at least one wheel of a set for which an eccentricity signal has been sensed to such a radial extent that said center (4) of rotation is maintained in said fixed position on said central rotation axis (6) even if the respective wheel has an eccentricity and whereby vibrations of said wheel set are prevented.

5. The apparatus of claim 4, wherein said eccentricity sensor comprises a sensor component connected to a wheel bearing housing.

6. The apparatus of claim 4, wherein said eccentricity sensor has a sensor component connected to a cover of a wheel bearing housing.

7. The apparatus of claim 4, wherein said eccentricity sensor comprises a laser diode forming a pick-up transmitter, and a four-quadrant diode forming a receiver.

8. The apparatus of claim 4, wherein said eccentricity sensor comprises a charge coupled device camera positioned to image target markings provided on one of a wheel bearing housing and a bearing housing cover.

9. The apparatus of claim 4, wherein said eccentricity sensor (7) comprises a triangulation sensor for measuring said excursions.

10. The apparatus of claim 4, wherein said eccentricity sensor is a sensor selected from the group consisting of induction sensors, capacity sensors, potentiometer sensors, and eddy current displacement sensors.

11. The apparatus of claim 4, further comprising a machine frame (F) and mounting elements (18, 18A; 19, 19A; 19', 19A') securing said guide rollers (3, 3A; 3', 3A') to said machine frame (F) in a movable manner for said position adjusting of said guide rollers by said power drive (8).

12. The apparatus of claim 11, wherein said mounting elements comprise pivoting levers (18, 18A) and journals (13) securing said pivoting levers to said machine frame (F) for an angular movement of said guide rollers relative to said wheel set.

13. The apparatus of claim 11, wherein said mounting elements comprise ball boxes (19, 19A, 19', 19A'), said guide rollers having guide rods passing through said ball boxes, said guide rods having ends connected to said support power drive (8).

14. The apparatus of claim 4, further comprising a wheel circumference measuring device (14) positioned on one of said guide rollers.

15. The apparatus of claim 4, wherein at least one guide roller of a pair of guide rollers comprises a guide flange (16) for axially supporting or restraining the respective wheel set by contacting a wheel flange (15).

16. The apparatus of claim 15, wherein said guide flange (16) is formed to conform to said wheel flange (15).

17. The apparatus of claim 4, wherein said support power drive comprises computer numerical controlled servomotors for applying said position adjusting force component.

18. The apparatus of claim 4, wherein said support power drive comprises a piston cylinder device (8) controlled by said central processing unit.

19. The apparatus of claim 4, further comprising a drive motor (M) connected to said wheel set for positively rotating said wheel set.

* * * * *

UNITED STATES PATENT AND TRADEMARK OFFICE
CERTIFICATE OF CORRECTION

PATENT NO. : 5,678,963
DATED : Oct. 21, 1997
INVENTOR(S) : Heimann

It is certified that error appears in the above-identified patent and that said Letters Patent is hereby corrected as shown below:

Col. 3, line 61, replace "change" by --changes--;

Col. 8, line 14, replace "Charge" by --(Charge--;

line 15, replace "Device" by --Device)--.

Signed and Sealed this

Seventeenth Day of February, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO.  : 5,678,963

DATED       : Oct. 21, 1997

INVENTOR(S) : Heimann

It is certified that error appears in the above-identified patent and that said Letters Patent is hereby corrected as shown below:

Col. 3, line 64, delete "eccentricity";
     line 65, delete "representing"; after "sensed" insert --eccentricity representing--.

Signed and Sealed this

Twenty-fourth Day of March, 1998

Attest:

BRUCE LEHMAN

Attesting Officer      *Commissioner of Patents and Trademarks*